United States Patent [19]
Sato et al.

[11] Patent Number: 5,412,694
[45] Date of Patent: May 2, 1995

[54] DATA DEMODULATOR

[75] Inventors: Toshifumi Sato; Takayuki Shibata; Hideo Ohmura, all of Tokyo, Japan

[73] Assignee: NEC Corporation, Tokyo, Japan

[21] Appl. No.: 24,227

[22] Filed: Mar. 1, 1993

[30] Foreign Application Priority Data

Feb. 27, 1992 [JP] Japan .................................. 4-041683
Feb. 27, 1992 [JP] Japan .................................. 4-041698

[51] Int. Cl.$^6$ ........................ H04L 27/14; H03D 3/22
[52] U.S. Cl. .................... 375/330; 375/324; 375/329
[58] Field of Search ............................ 375/80, 83, 84

[56] References Cited

U.S. PATENT DOCUMENTS

| | | | |
|---|---|---|---|
| 4,466,108 | 8/1984 | Rhodes | 375/83 |
| 4,814,719 | 3/1989 | Guyer | 375/83 |
| 4,849,991 | 7/1989 | Arnold et al. | 375/84 |
| 4,896,336 | 6/1990 | Henely | 375/80 |
| 5,202,901 | 4/1993 | Chennakeshu | 375/84 |

OTHER PUBLICATIONS

"RCR Standards on Digital Cellular Telecommunication Systems", RCR STD-27A, Jan. 1992, Research & Development Center for Radio Systems.
Technical Report of the Institute of Electronics, Information and Communication Engineers, Japan, RCS89-64, Mar. 1990.
41st IEEE Vehicular Technology Conference, pp. 652-656, May 1991.

Primary Examiner—Edward L. Coles, Sr.
Assistant Examiner—John Ning
Attorney, Agent, or Firm—Sughrue, Mion, Zinn, Macpeak & Seas

[57] ABSTRACT

A data demodulator wholly consisting of digital circuits for time division multi-access (TDMA) signals subjected to differential phase-shift-keying (DPSK) is provided. The data demodulator generates a phase difference signal by subjecting $\pi/4$-shift quadrature phase-shift-keying ($\pi/4$ QPSK) signals to delayed detection of phase in synchronism with N-phase clock signals (where N is a positive integer), and reproduces a resulting phase difference signal into decision data. A first such data demodulator detects decision errors from the phase difference signal and decision data, and achieves symbol synchronism by sampling the decision data in a clock signal phase involving little decision error. A second such data demodulator supplies the phase difference signal after correcting its D.C. offset due to a frequency drift. In these two data demodulators, the formulas for computing said decision errors and correction values are flexibly varied according to preceding burst information.

36 Claims, 7 Drawing Sheets

| p3 | d1 | ea |
|---|---|---|
| $-\pi \sim -\pi/2$ | (1,1) | $(p3+3\pi/4)^2$ |
| $-\pi/2 \sim 0$ | (1,0) | $(p3+\pi/4)^2$ |
| $0 \sim \pi/2$ | (0,0) | $(p3-\pi/4)^2$ |
| $\pi/2 \sim \pi$ | (0,1) | $(p3-3\pi/4)^2$ |

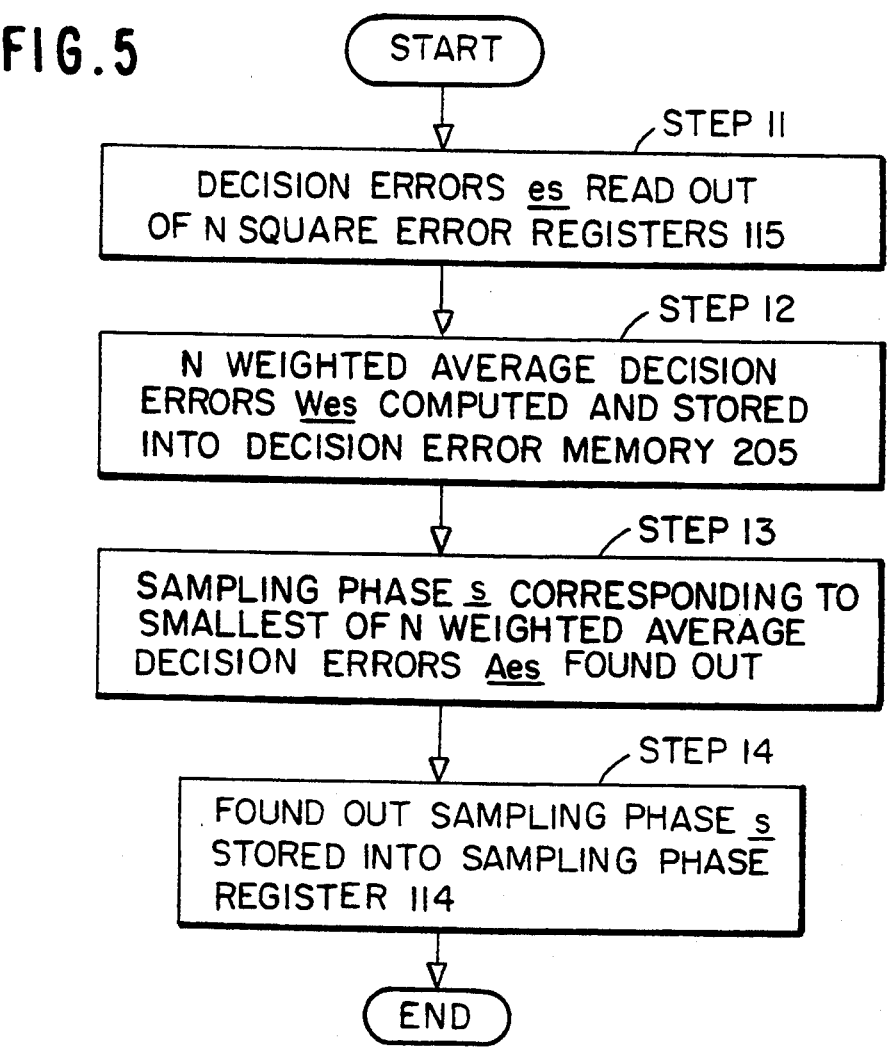
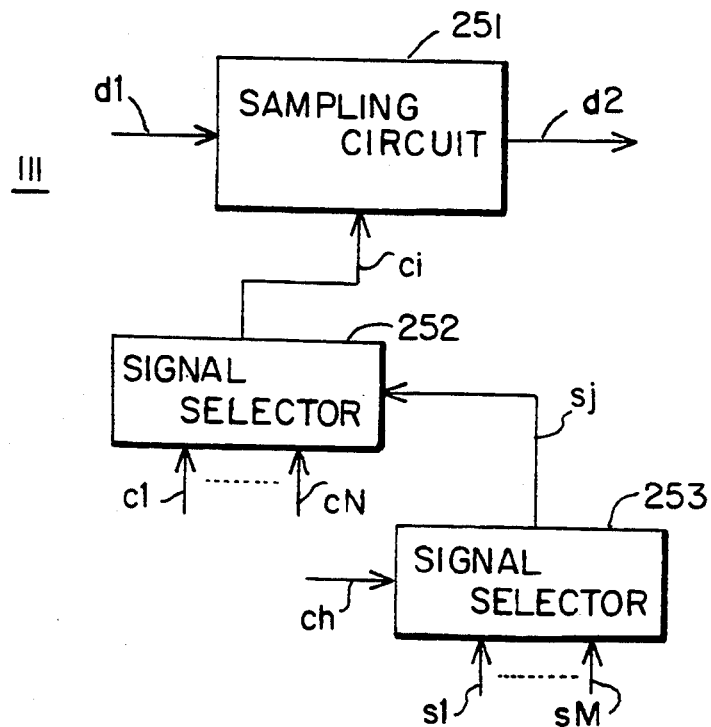

DATA DEMODULATOR

BACKGROUND OF THE INVENTION

1. Field of the Invention

The present invention relates to a data demodulator for reproducing digital data from receive signals which have undergone differential phase-shift-keying (DPSK), and more particularly to a data demodulator wholly consisting of digital circuits, well suitable for digital cellular telecommunication systems of an M-channel (M is a positive integer) multiplex time division multi-access (TDMA) formula.

2. Description of Related Art

In a digital cellular telecommunication system subject to fading, it is recommended to use $\pi$/four-shift quadrature phase-shift-keyed ($\pi$/4 QPSK) signals in transmission and reception between the radio base station and any mobile unit (for instance according to "RCR Standards on Digital Cellular Telecommunication Systems", RCR STD-27A, January 1992, Research & Development Center for Radio Systems). A data demodulator for DPSK signals should correct frequency drifts (or frequency offsets) of receive signals while achieving appropriate symbol synchronization, and thereby improve the error rate of the demodulated data. Furthermore, a data demodulator for use in a TDMA system should quickly achieve symbol synchronization of burst signals, correct their frequency drifts and, where continuous reception takes place, accomplish said symbol synchronization and frequency drift correction taking account of resistance to noise and other pertinent factors.

One of the data demodulators embodying an attempt to address these problems is proposed in the 41st IEEE Vehicular Technology Conference, pp. 652–656, May 1991 and the Technical Report of the Institute of Electronics, Information and Communication Engineers, Japan, RCS89-64, March 1990. This data demodulator using adaptive carrier tracking (ACT), developed for use in mobile units which have to be compact and consume little power, detects the phase of $\pi$/4 QPSK signals by comparing the phase of the $\pi$/4 QPSK signals in an intermediate frequency band with that of a reference signal, and supplies the detected phase directly in a digital value. The data demodulator demodulates this digitized detected phase with digital circuits permitting large scale integration (LSI), and provides four-value code decision data.

The aforementioned ACT type data demodulator controls the frequency and phase of said reference signal independently of each other with an ACT circuit, an automatic frequency control (AFC) circuit and a phase/frequency control circuit to correct the carrier phase rotation of the $\pi$/4 QPSK signals on a symbol-by-symbol basis. This data demodulator, because it controls the frequency drifts of the $\pi$/4 QPSK signals relative to the reference signal and the reference phase for phase detection independently of each other, is quick in responding to burst signals such as TDMA signals, but has no function to optimize symbol synchronism. This data demodulator, moreover, requires more or less complex circuits for controlling the phase and frequency, such as said ACT circuit, AFC circuit and phase/frequency control circuit.

SUMMARY OF THE INVENTION

Objects of the Invention

A first object of the present invention is to provide a fully digitized data demodulator for differential phase-shift-keyed (DPSK) signals, readily permitting large scale integration (LSI) and dispensing with adjustment.

A second object of the invention is to provide a data demodulator suitable for the reception of TDMA signals.

A third object of the invention is to provide a data demodulator having means for optimal adjustment of the symbol synchronism phase of demodulated data.

A fourth object of the invention is to provide a data demodulator having means to correct the frequency drifts of receive signals.

A fifth object of the invention is to provide a data demodulator permitting the realization of said symbol synchronizing means and frequency drift correction means in simple configurations.

A sixth object of the invention is to provide a data demodulator capable of flexibly varying the quantity of the setting of said symbol synchronism phase and that of said frequency drift correction according to the state of receive signals.

Summary of the Invention

A data demodulator according to the present invention subjects DPSK-modulated TDMA signals to delayed detection by phase detection means, delay means and phase difference detection means connected in cascade to generate phase difference signals synchronized with N-phase clock signals. These phase difference signals are reproduced into decision data by decision means.

In one preferred embodiment of the invention, this data demodulator obtains symbol-synchronized demodulated data by sampling said decision data with the optimal one among N sampling phases. This data demodulator is characteristic in the method of selecting said optimal sampling phase. First sampling phase calculating means adds for a prescribed period a decision error signal based on the difference between said phase difference signal and decision data every time said N-phase clock signal is entered, and selects as said sampling phase the phase of the clock signal corresponding to the signal indicating the smallest value among the added N decision error signals. Second sampling phase calculating means weights the adding method of said decision error signals according to the reception state of the TDMA signals. One of the ways it is weighted is to subject the sampling phase obtained from a preceding TDMA burst and a newly obtained sampling phase to weighted averaging to give a normal sampling phase.

In another preferred embodiment of the invention, this data demodulator is provided, between said phase difference detection means and said decision means, with subtraction means for subtracting a correcting value from said phase difference signal to eliminate the D.C. offset of said phase difference signal due to the frequency drift of the receive signal. This data demodulator is characteristic in the method of calculating said correcting value. First correcting value calculating means calculates the average of decision error signals based on the differences between said phase difference signals and decision data during a certain period, and provides this average as said correcting value. Second correcting value calculating means weights the method of calculating said correcting value according to the reception state of the TDMA signals. One of the ways it is weighted is to take into account a correcting value obtained from a preceding TDMA burst in the calculation of said correcting value.

BRIEF DESCRIPTION OF THE DRAWINGS

The above-mentioned and other objects, features and advantages of the present invention will become more apparent from the following detailed description when taken in conjunction with the accompanying drawings, wherein:

FIG. 5 is a flow chart showing one of the operations of the signal processor 107A illustrated in FIG. 4;

FIG. 6 is a detailed block diagram of the signal sampling circuit 111 in the embodiment shown in FIG. 1;

DETAILED DESCRIPTION OF THE PREFERRED EMBODIMENTS

Figure 1:
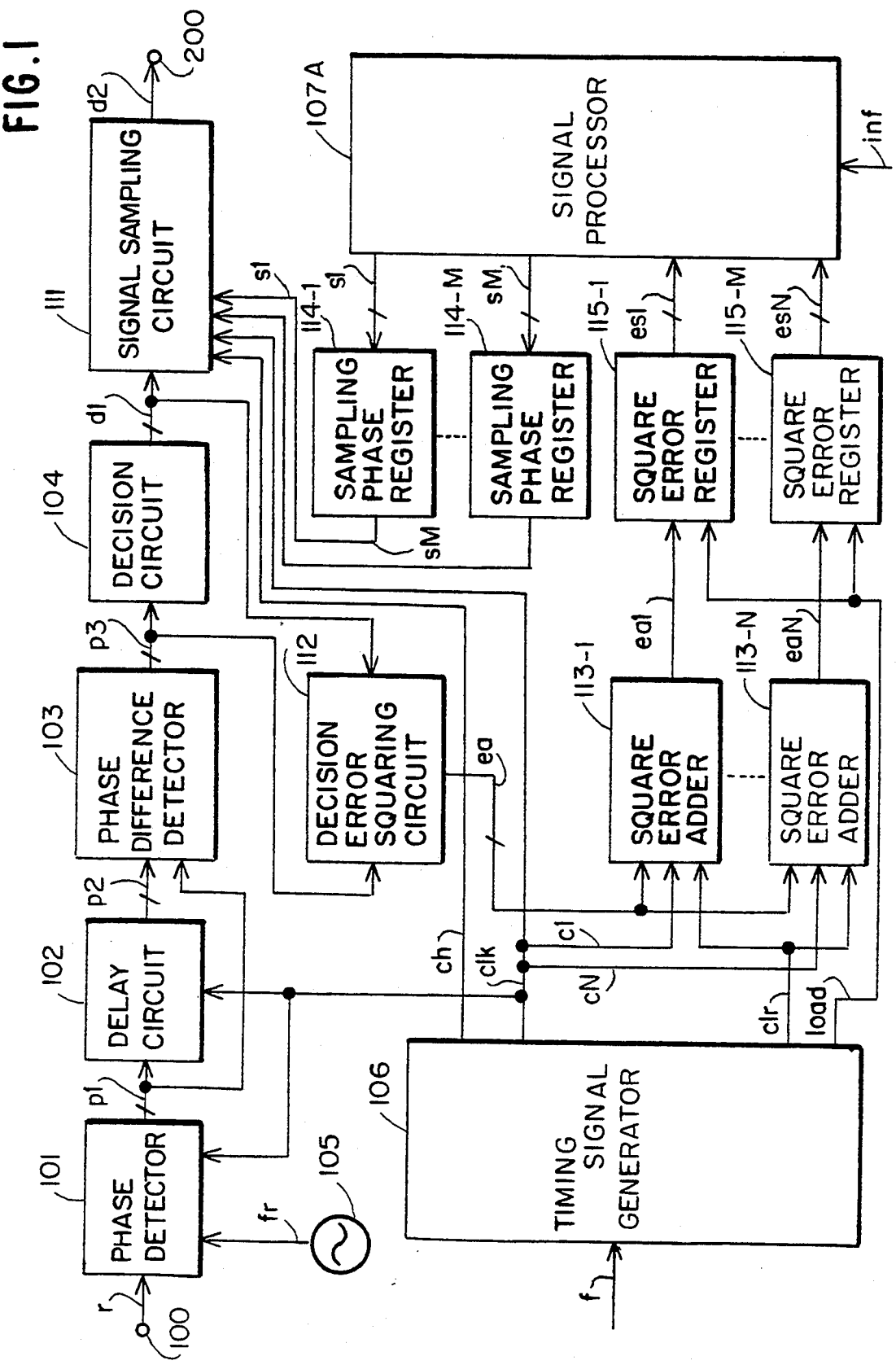
FIG. 1 is a block diagram of a preferred embodiment of the invention.
Figures 2, 4:
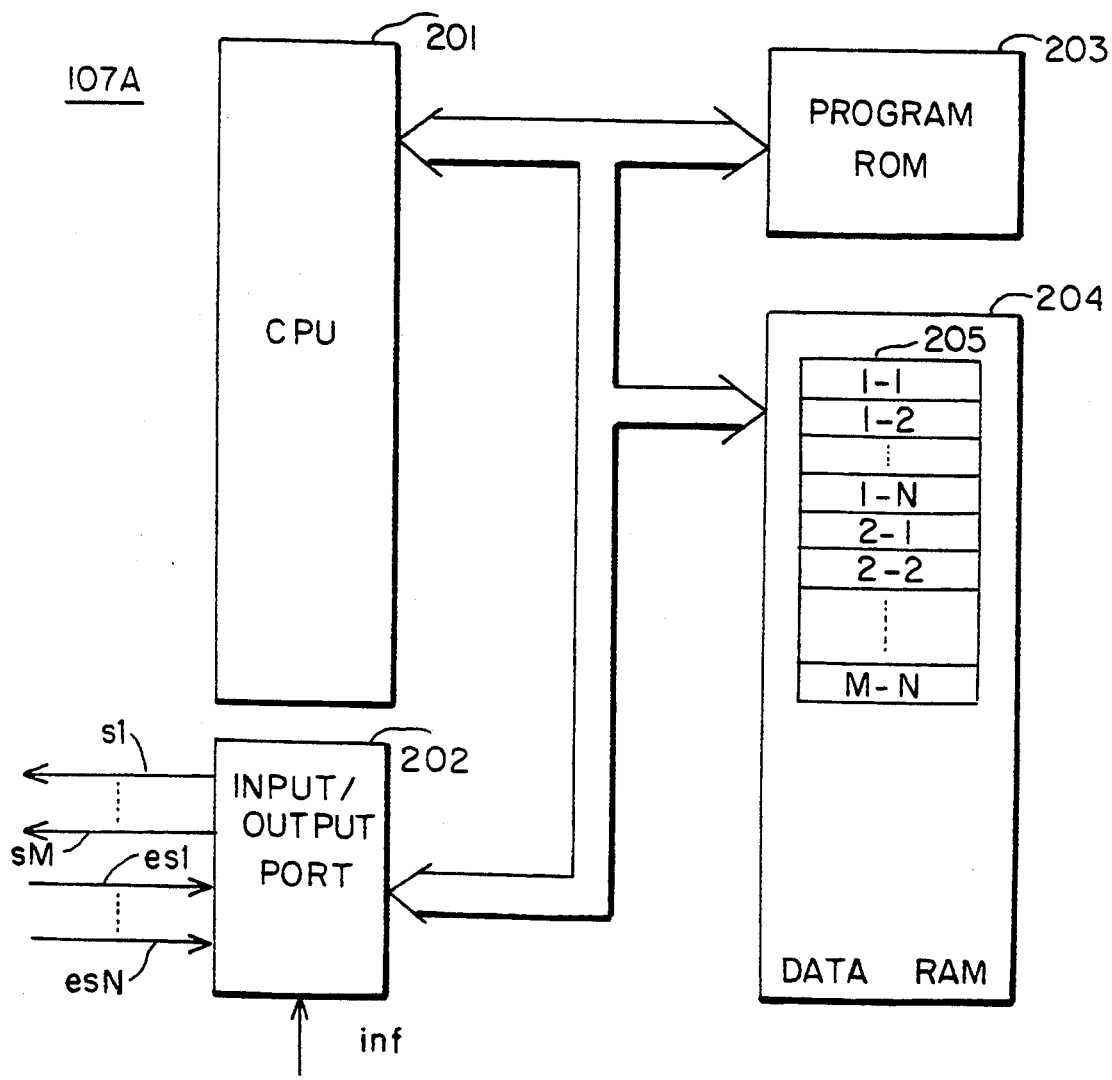
FIG. 2 is a chart showing the values of the phase difference signal p3, the decision data dl and the square ea of the decision error in the embodiment illustrated in FIG. 1.
FIG. 4 is a detailed block diagram of the signal processor 107A in the embodiment shown in FIG. 1.
Figure 3:
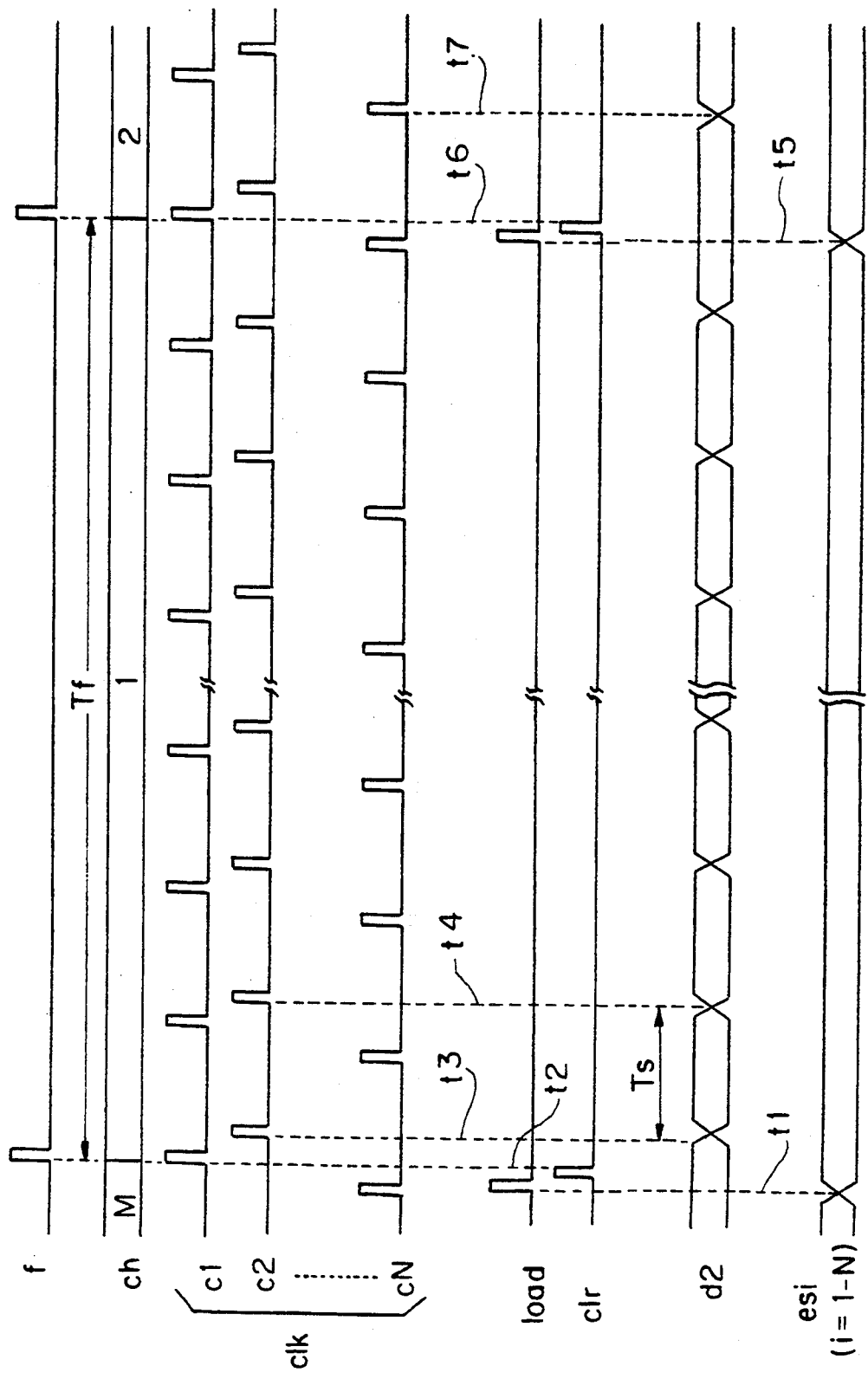
FIG. 3 is a timing chart of signals in the embodiment shown in FIG. 1.

Referring to FIGS. 1, 2 and 3 together, this data demodulator constitutes part of the base station apparatus of a digital cellular telecommunication system of a TDMA formula. This base station apparatus includes a transmitter unit (not shown) for transmitting M-channel TDMA signals, a receiver unit (not shown) for receiving $\pi/4$ QPSK signals of the 800 MHz band transmitted over a designated channel among the M TDMA signal channels, and a control unit (not shown) for controlling said transmitter unit and receiver unit. The high frequency section of said receiver unit converts the received $\pi/4$ QPSK signals into receive signals r of an intermediate frequency (455 kHz, for instance) band. The data demodulator receives this $\pi/4$ QPSK-modulated receive signals r at an input terminal 100.

The data demodulator, wholly consisting of digital circuits, includes phase detector 101, delay circuit 102, phase difference detector 103, decision circuit 104, and reference signal generator or oscillator 105 for generating a reference signal fr of a frequency substantially equal to K (K is a positive integer) times the center frequency of the receive signal r, all known means to persons skilled in the art. The phase detector 101 shapes the waveform of the receive signal r from the input terminal 100 to a logic level, and detects the phase of the receive signal r by comparing the zero cross point of this wave-shaped receive signal r and that of a signal resulting from the frequency division of the reference signal fr by K. The phase detector 101 further samples this detected phase N times per symbol (period Ts) of the receive signal r with N-phase (N is a positive integer) clock signals clk, i.e. cl, ..., cN, from a timing signal generator 106A, and gives this sampled detected phase as the phase signal p1 of the receive signal r. Thus, the phase detector 101 outputs N-phase signals p1 per symbol in numerical data in a parallel form in response to the receive signal r, the reference signal fr and the clock signals clk. The accuracy of the phase detection of the receive signal r by the phase detector is 2 $\pi/K$ radians.

The phase signal p1 is supplied to the delay circuit 102, which generates a delayed phase signal p2 by delaying the phase signal p1 by one symbol. The phase difference detector 103 generates a phase difference signal p3 by subtracting the delayed phase signal p2 from the phase signal p1 (p3=p1−p2). The phase difference signal p3 is the difference between the phase signal p1 earlier by one symbol (the delayed phase signal p2) and a newly received phase signal p1, i.e. a signal resulting from delayed detection of a $\pi/4$ QPSK-modulated receive signal r. The decision circuit 104 compares the phase difference signal p3 with a predetermined value, and generates decision data dl of a two-column four-value signal (see FIG. 2). Thus, the decision circuit 104 determines which of four ranges including ($-\pi$ to $-\pi/2$), ($-\pi/2$ to 0), (0 to $\pi/2$) and ($\pi/2$ to $\pi$) the phase difference signal p3 belongs to, and generates decision data dl corresponding to the defined range, i.e. (1, 1), (1, 0), (0, 0) or (0, 1). Here, N pairs of decision data dl are generated per symbol of the receive signal r.

The constituent elements which characterize this preferred embodiment will be described below. Here, timing signal generator 106 receives a frame signal f from the control unit of said base station apparatus every time the receive TDMA channel (frame) is switched (times t2 and t6), and generates a channel number indicating signal ch synchronized with the frame signal f, a clock signal clk, a clear signal clr and a sampling signal load (see FIG. 3). Thus, the timing signal generator 106 generates the clock signal clk beginning at the switching times t2 and t6 of the TDMA channel, the channel number indicating signal ch upon reception of the frame signal f, the sampling signal load at the final ones of the reception timing for a specific TDMA channel (times t1 and t5), and the clear signal clr immediately after the generation of the sampling signal (times t2 and t6).

First will be described the operation of the preferred embodiment illustrated in FIG. 1 when the receive signals r are consecutive. In this case, the timing signal generator 106 does not generate the channel number indicating signal ch, but generates the sampling signal load and the clear signal clr in prescribed periods, here in the same frame periods Tf as when the receive signals r are M-channel TDMA signals.

Decision error squaring circuit 112 generates the square ea of the decision error in response to the N-phase phase difference signal p3 and the decision data dl (see FIG. 2). Thus, the squares of the differences between decision phases $-3\pi/4$, $-\pi/4$, $\pi/4$ and $3\pi/4$ radians respectively corresponding to the decision data dl (1, 1), (1, 0), (0, 0) and (0, 1) and the phase represented by the phase signal p3 are obtained at the output of the circuit 112 in the relationship of correspondence shown in FIG. 2. When the receive signal r is a $\pi/2$-shifted BPSK signal, the decision circuit 104 decides which of the two ranges ($-\pi$ to 0) and (0 to $\pi$) the phase difference signal p3 belongs to, and generates a decision datum d1 corresponding to that range, i.e. (1) or (0). Therefore, the decision phase corresponding to the decision data d1 of the $\pi/2$-shifted BPSK signal are $-\pi/2$ and $\pi/2$ radians.

Each of N square error adders 113-1, ..., 113-N adds the square ea of the decision error every time a clock signal c1, ..., or cN of the corresponding phase is entered to generate decision error sums ea1, ..., eaN, and clears the decision error sums ea1, ..., eaN upon inputting of the clear signal clr. The decision error sums ea1, ..., eaN are stored into square error registers 115-1, ..., 115-N, which sample the decision error sums ea1, ..., eaN at the timing of the sampling signal load (time t1), and supply the sampled decision error sums es1, ..., esN to signal processing means 107A. The data generated by the square error adders 113-1, ..., 113-N are acceptable if they are based on the decision errors (p1−d1) in the different phases of the clock signals clk. Therefore, the decision error squaring means 112 may be replaced with decision error detection means generating the absolute values of the decision errors (p1−d1).

The signal processing means 107A responds to the decision error sums es1, ..., esN which have been read out and to reception information inf from said control unit, and calculates a sampling phase signal sl by a sampling phase calculating technique to be described below. This sampling phase signal sl, which is instructing information to have signal sampling means 111 sample the decision data d1 in a selected phase of the clock signal clk, indicates the phase number of the clock signal clk. The signal processor 107A writes the sampling phase signal sl into a sampling phase register 114-1. The signal sampling circuit 111 samples the decision data d1 at a timing (in a phase) instructed by a clock signal clk and the sampling phase signal sl from the phase register 114-1, and generates at an output terminal 200 demodulated data d2 at a symbol rate resulting from the optimizing adjustment of the symbol synchronism phase. Incidentally, since "2" is written in the phase register 114-1 on the TDMA channel "1" in FIG. 3, the symbol synchronism timing of the demodulated data d2 is the second phase of the clock signal clk (times t3 and t4).

With further reference to FIGS. 1 through 3, the operation of the preferred embodiment which takes place when the receive signal r is an M-channel TDMA signal will be described below.

The data demodulator for demodulating M-channel TDMA signals is provided with M sampling phase registers 114-1, ..., 114-M corresponding to the number of channels, M. The signal processor 107A calculates a sampling phase number sj (j is an integer neither smaller than 1 nor greater than M) in response to the decision error sums es1, ..., esN read out at every timing of reception end and to the receive information inf, and writes this sampling phase signal sj into the sampling phase register 114-j for the jth channel. Thus, the sampling phase registers 114-1, ..., 114-M write sampling phase signals sl, ..., sM of the respectively corresponding TDMA channels. The signal sampling circuit 111 samples the decision data d1 at the sampling timing indicated by the sampling phase channel sj corresponding to the channel number indicating signal ch and by a clock signal clk. The TDMA channel "1" in FIG. 3 indicates the symbol synchronism timings of the demodulated data d2 when "2" is written in the phase register 114-1 (times t3 and t4), and the TDM channel "2" shows the symbol synchronism timing of the demodulated data d2 when "N" is written in the phase register 114-N (time t7).

Referring now to FIG. 4, the input/output (I/O) port 202 of the signal processor 107A reads out the decision error sums es1, ..., esN from the square error registers 115-1, ..., 115-N, respectively, upon completion on every TDMA channel. These decision error sums es1, ..., esN are separately stored in N×M decision error storing memories 205. A microprocessor (CPU) 201 computes the optimal sampling phase signal sj for each TDMA channel in response to one or another of these decision error sums es1, ..., esN, and writes this sampling phase signal sj into the sampling phase register 114-j for the corresponding TDMA channel via the I/O port 202. The CPU 201 operates in accordance with a program stored in a program ROM 203.

One of the techniques to compute the optimal sampling phase signal sj for the decision data d1 is suitable for use when it is desired to subject a receive signal r in a burst state (burst signal) to symbol synchronization upon start of reception. When the square error registers 15-1, ..., 115-N sample the decision error sums es1, ..., esN, respectively, the signal processor 107A reads out these decision error sums es1, ..., esN to find out the smallest decision error sum esi. The timing of the clock signal clk for the square error register 115-8 to give this smallest sum esi, i.e. the phase of the ith phase clock signal ci, is selected as the optimal sampling phase for the decision data d1. This method to compute the optimal sampling phase signal si is applicable irrespective of whether the number of TDMA channel(s) is one or more.

Another technique to compute the optimal sampling phase si is suitable for use when the receive signal r is a TDMA signal. This is based on the fact that the drift of the optimal sampling phase signal si is extremely small between burst signals in which TDMA signals of the same channel adjoin one another. The signal processor 107A finds out a new sampling phase signal si by subjecting the past sampling phase values si and a newly computed sampling phase signal si to weighted averaging instead of computing an entirely new optimal sampling phase signal si for each sample of the decision error sums es1, ..., esN. Thus, the signal processor 107A computes a weighted average decision error wesi for each of the first to the Nth phases by Equation (1), and selects as the new sampling phase signal si the phase of the clock signal ci of the square error register 115-i which gives the smallest value of this weighted average decision error wesi.

$$wesi = \{(decision\ error\ sum\ esi) \cdot w + (value\ stored\ in\ decision\ error\ storing\ memory\ 205) \cdot (1-w)\} \quad (1)$$

where $0 \leq$ the weighting coefficient $w \leq 1$.

By this sampling phase computing method, the greater the weighting coefficient w, the sooner the symbol synchronization. Therefore, the value of the weighting coefficient w is set greater immediately after the start of reception of receive signals r on a given channel and, after completion of the synchronization, it is reduced to a smaller value to restrain fluctuations due to noise superimposed on the receive signals r. When no receive signal r is received, the square error memories 205 are cleared and, when the reception of receive signals r is to begin, the sampling phase signal si is determined solely on the basis of the value of the square error register 115-i. As a result, the symbol synchronization of burst signals r with short preambles is accelerated in this data demodulator. The CPU 201 varies the weighting coefficient w in response to the receive information inf notifying the state of the reception of said receive signals r from said control unit and to the software program of the program ROM 203. Incidentally, since it is undesirable to let the square error memories 205 to be cleared by any instantaneous interruption of the receive signal r, the signal processor 107A requires protecting means to prevent the square error memories 205 from being cleared and the sampling phase signal si from varying abruptly in time of instantaneous interruption of the receive signal r.

Known means can be utilized for the collection of aforementioned receive information inf. Thus, said receiver apparatus detects the receive field intensity of the $\pi/4$ QPSK signals received and, if this receive field intensity is above a prescribed level, will supply the receive information inf to the signal processor 107 via said control unit. If the receive signals r include any sync signal, sync signal detecting means known to those skilled in the art will transmit the receive information inf upon detection of said sync signal. Or, if the receive signals r are in the form of error detection codes, the error detecting means of said receiver unit will transmit the receive information inf upon detection of said error detection codes. Or, said control unit will transmit the receive information inf upon detection of a signal expected in advance. As described above, since various means are available for judging whether or not signals are being received, said radio apparatus can use a suitable one of them for this data demodulator to supply the receive information inf to the signal processor 107A.

Referring to FIG. 5, this flow chart shows the second technique for computing the sampling phase. The CPU 201 reads out decision errors es1, . . . , esN from the square error registers 115-1, . . . , 115-N, respectively, at the time of reception end on a certain TDMA channel (t1 if its is the Mth channel) (step 11). The CPU 201 further reads out the contents of the decision error storing memories 205 corresponding to these decision errors es1, . . . , esN (M-1, . . . , M-N if it is the Mth channel), computes the weighted average decision errors wes1, . . . , wesN by Equation (1), and stores these weighted average decision errors wes1, . . . , wesN into the decision error storing memories 205 (M-1, . . . , m-N) (step 12). The CPU 201 then computes the sampling phase signal si (sM if it is the Mth channel) corresponding to the smallest value of the weighted average decision errors wes1, . . . , wesN (step 13). Finally, the CPU 201 stores the computed sampling phase signal si into the sampling phase register 114-j (114-M if it is the Mth channel) (step 14). This flow of sampling phase computation is repeated for each channel of the TDMA signals.

Referring now to FIG. 6, a signal selector 253 of this signal sampling circuit 111 selects one of the M sampling phase signals s1, . . . , sM as designated by the channel number indicating signal ch. Since the first through Mth channels are used in repeated cycles for the TDMA signals, the signal selector 253, every time the channel number indicating signal ch is entered, selects the sampling phase signal sj for the next channel (supposed to be jth channel) following modulo M. This sampling phase signal sj is used as the control signal for another signal selector 252. The signal selector 252 selects one of N clock signals clk (c1, . . . , cN), ci in this case, according to the phase number i indicated by the sampling phase signal sj. A sampling circuit 251 samples the decision data dl with the phase of the clock signal ci selected as the optimal sampling phase, and generates demodulated data d2 of the symbol rate.

As described above, the data demodulator, which is the preferred embodiment illustrated in FIG. 1, readily permits large scale integration and dispenses with adjustment because it wholly consists of digital circuits. As it optimizes the symbol synchronism phase for every channel of TDMA signals, demodulated data d2 with the least error rate can be obtained for each channel. Furthermore this data demodulator, which flexibly various the technique to set the sampling phase signal si for the decision data dl according to the contents of receive signals r, can achieve quick symbol synchronization at the time of starting the reception of burst signals and, at the same time, realize the reproduction of data with less errors in consecutive reception on the same TDMA channel even if the the receive signals r are accompanied by much noise.

Figure 7:
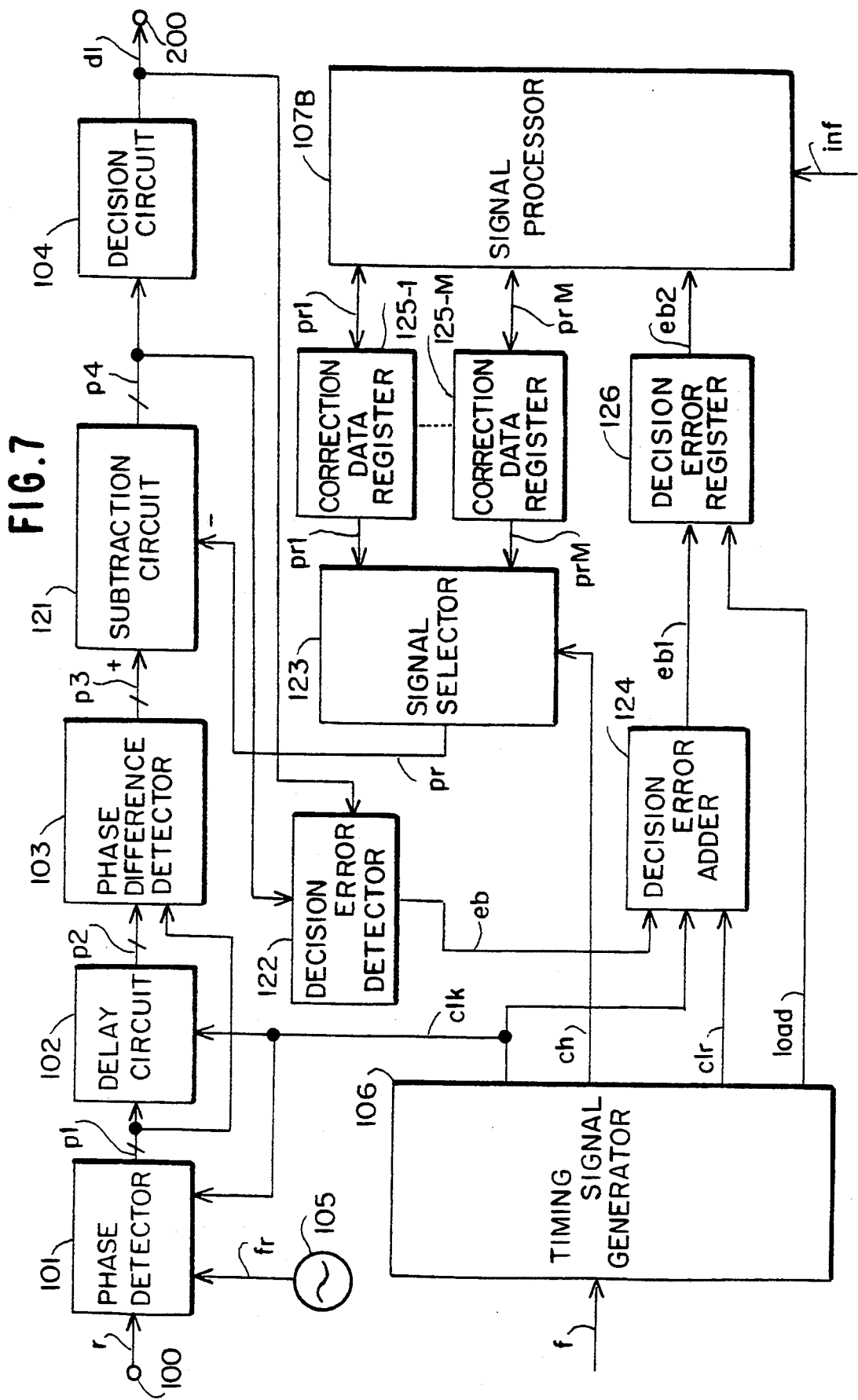
FIG. 7 is a block diagram of another preferred embodiment of the invention.

Referring now to FIG. 7, a data demodulator illustrated in this drawing, which is another preferred embodiment of the present invention, like the one shown in FIG. 1, includes phase detector 101 for receiving a receive signal r having undergone $\pi/4$ QPSK modulation from an input terminal 100, delay circuit 102, phase difference detector 103, decision circuit 104, reference signal generator 105 for generating a reference signal fr, and timing signal generator 106. This data demodulator further includes subtraction circuit 121 arranged between the phase difference detector 103 and the decision circuit 104, and signal processor 107B, which is substantially similar to its counterpart in the embodiment shown in FIG. 1. The signal processor 107B, though having the same constituent elements as the signal processor 107A, is different in the way it processes signals as will be described below.

If the center frequency of the receive signal r differs from 1/K of the reference signal fr (i.e. if the receive signal r has a "frequency drift"), a phase difference signal p3 will have a D.C. offset. If this phase difference signal p3 having a D.C. offset is directly supplied to the decision circuit 104, the decision circuit 104 will generate decision data dl with many errors due to the D.C. offset. To eliminate this disadvantage, the subtraction circuit 121 subtracts from the phase difference signal p3 a correction value pr for the frequency drift, and thereby generates a corrected phase difference signal p4 cleared of the D.C. offset due to the frequency drift. This corrected phase difference signal p4 is supplied to the decision circuit 104, which generates decision data dl whose data errors due to said frequency drift have been reduced.

Figures 8, 10:
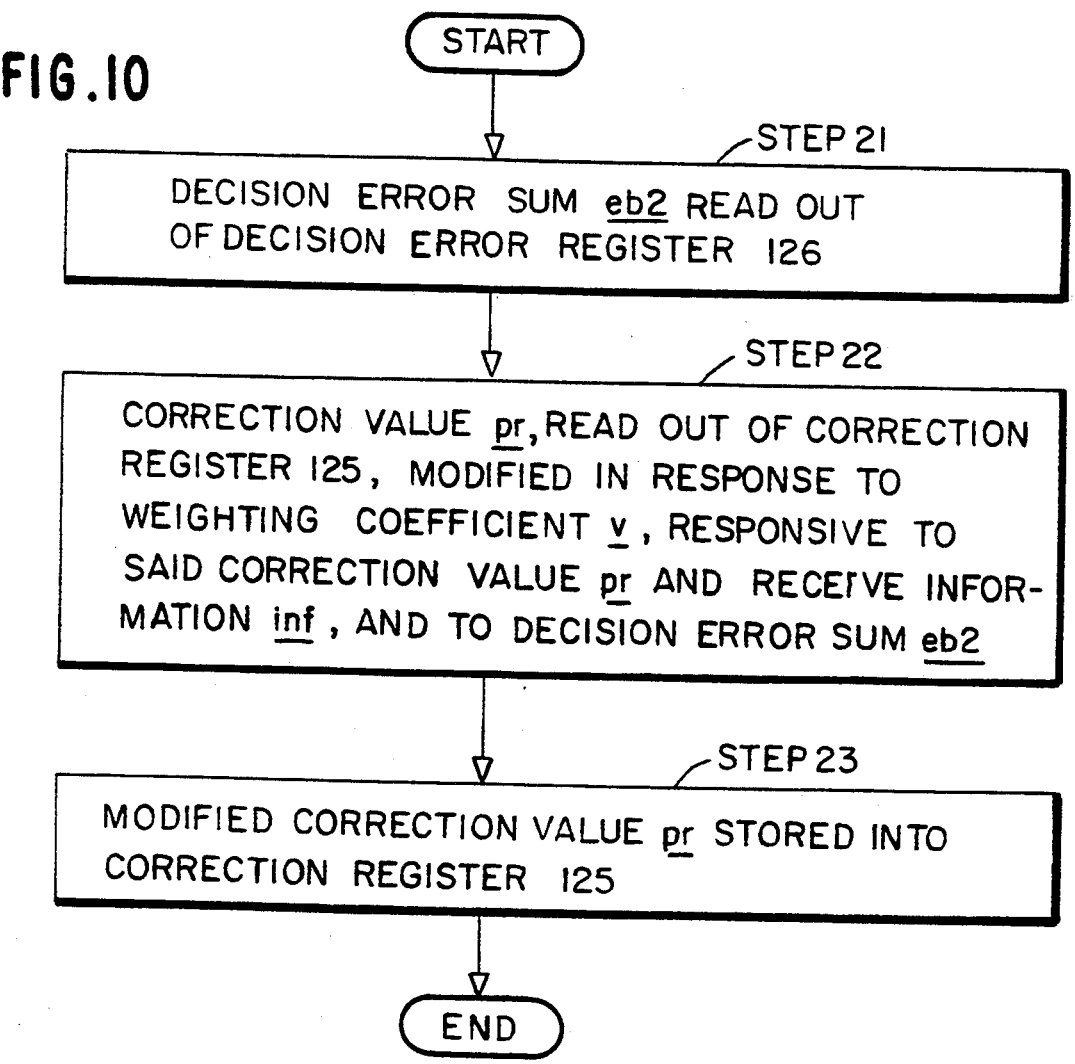
FIG. 8 is a chart showing the values of the phase difference signal p4, the decision data dl and the decision error eb in the embodiment illustrated in FIG. 7.
FIG. 10 is a flow chart showing one of the operations of the signal processor 107B illustrated in FIG. 7.

Referring to FIG. 8 together, decision error detector 122 generates a decision error eb in response to the corrected phase difference signal p4 and the decision data dl. Thus, the decision phases corresponding to the decision data dl (1, 1), (1, 0), (0, 0) and (0, 1) are $-3\pi/4$, $-\pi/4$, $\pi/4$ and $3\pi/4$ radians, respectively.

Figure 9:
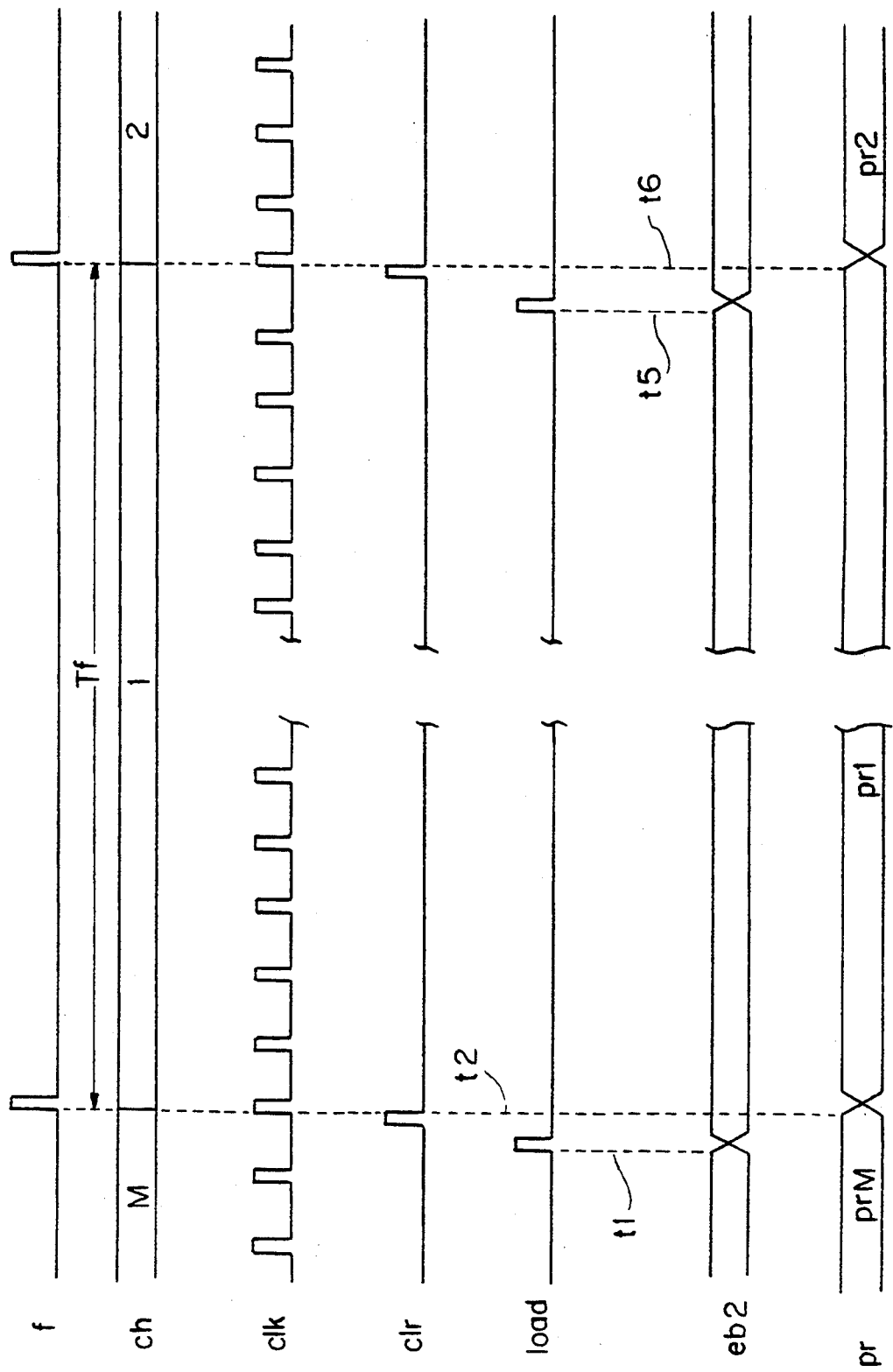
FIG. 9 is a timing chart of signals in the embodiment shown in FIG. 7.

Referring further to FIG. 9 together, decision error adding means 124 generates a decision error sum ebl by adding a decision error eb every time a clock signal clk N times the symbol rate, i.e. having N phases, is entered, and clears the decision error sum ebl at a timing before the start of reception on each TDMA channel (time t2 for channel "1" and time t6 for channel "2") in response to a clear signal clr. The period during which the decision error signals eb are added is one TDMA frame period (period Tf). Where clock signals clk in correct symbol synchronism with the receive signals r are obtained, the decision error adder 124 can maintain an adequate level of frequency drift estimating accuracy even if the decision errors eb are added with clock signals clk of a period equal to the symbol period (i.e. N=1).

The decision error sum eb1 is supplied to a decision error register 126, which samples the decision error sum eb1 at the timings of a sampling signal load (times t1 and t2), and supplies the sampled decision error sum eb2 to the signal processor 107B.

The signal processor 107B computes frequency drift correction values pr1, ..., prM for each TDMA channel of the receive signals r as will be described below in response to a decision error sum es3 that has been read out and to receive information inf, and writes these correction values pr1, ..., prM into respectively corresponding correction data registers 125-1, ..., 125-M. A signal selector 123 selects the correction data register 125-j of the jth channel indicated by a channel number indicating signal ch, and supplies the subtraction circuit 121 with the correction value prj stored in the correction data register 125-j as the correction value pr. Thus, referring to FIG. 9, the signal selector 123 supplies the subtraction circuit 121 with the correction value pr=prM at the timing of the reception of signals on channel M (until time t2), and with the correction value pr=pr1 at the timing of the reception of signals on channel "1" (from time t2 through time t5). Since the switching of the correction value pr by the signal selector 123 can be accomplished instantaneously, this data demodulator can immediately correct any frequency drift even at the timing of switching the channel for receive signals r differing in frequency drift from one TDMA channel to another. This quick switching of the correction value pr is especially useful for a data demodulator which requires switching of the correction value pr in a matter of tens of microseconds as in a digital cellular telecommunication system according to the above-cited RCS STD-27A (the bit rate is 42 kbps, M=3).

Next will be described the first technique for computing the correction value, suitable for prompt setting of the correction values pr1, ..., prM at the time of, for instance, starting the reception of burst signals r.

The signal processor 107B reads out, every time the decision error register 126 samples the decision error sum eb2, this decision error sum eb2, and computes the average prj of the decision errors eb on this channel (supposed to be the jth channel) in every fixed period, which is one frame period Tf of TDMA signals here. Where one frame period Tf consists of H symbols, the decision error eb is added N×H times, and the average prj is represented by Equation (2). The signal processor 107B has, in its data RAM 204, M decision error storing memories 205, in which the decision error sums eb2 are stored on a channel-by-channel basis.

$$prj = eb2/(N \cdot H) \tag{2}$$

The value prj, which is the average of decision errors eb on this jth channel, represents the D.C. offset quantity of the phase difference signal p4. If this average prj is obtained on, for instance, the Mth channel, the correction value prM currently set for the Mth channel will be deviating from the proper correction value by the average prj. Therefore, the signal processor 107B adds this average prj to the correction value prM stored in the correction data register 125-M for the M-th channel as indicated by Formula (3), and writes the sum of this addition into the correction data register 125-M as a new correction value prM.

$$PrM \leftarrow PrM + eb2/(N \cdot H) \tag{3}$$

If this new correction value prM is a sufficiently corrected value, the corrected phase difference signal p4 on the Mth TDMA channel will thereafter have no D.C. offset, and the Mth channel will be cleared of the impact of the frequency drift.

Next will be described the second technique for computing the correction value, suitable for correcting frequency drifts of TDMA signals from the same communication partner station (on the same channel).

Center frequency fluctuations of receive signals r being consecutively received on the same TDMA channel are in many cases likely to be extremely small between adjoining bursts. In such a case, if the correction value pr is varied with a limited quantity of correction instead of finding out a totally new frequency drift correction value pr for each burst, the detected fluctuation quantity of frequency drifts in the presence of much noise accompanying receive signals r is likely to be reduced. Therefore, according to this correction value computing technique, the correction value pr. is computed with weighting by a weighting coefficient v as indicated by Formula (4).

$$prM \leftarrow prM + (eb2/(N \cdot H)) \cdot v = prM + eb2 \cdot v1 \tag{4}$$

where $0 \leq$ weighting coefficient $v \leq 1$, $v1 = v/(N \cdot H)$.

According to the second correction value computing technique, the greater the value of the weighting coefficient v, the shorter the period of frequency drift correction. Therefore, immediately after the start of receiving burst signals r, the value of the weight coefficient v is set greater, and it is reduced to a smaller value after the completion of frequency drift correction, when the correction value prM becomes smaller than a prescribed level, to restrain the fluctuations of the correction value prM due to receiver noise. In particular, by setting the weighting coefficient to 1 at the time of receiving the first burst signal r (the same as by the first correction value computing technique), the frequency drift can be immediately corrected. To judge whether or not any receive signal r is being received, exactly the same method as what was explained with regard to the first preferred embodiment of FIG. 1 can be used, i.e. according to the receive information inf supplied from the control unit to the signal processor 107B. Incidentally, since it is undesirable to let the definition error memories 205 to be cleared by any instantaneous interruption of the redeive signal r, the signal processor 107B requires protecting means to prevent the decision error memories 205 from being cleared and the correction value pr from varying abruptly in time of instantaneous interruption of the receive signal r.

Referring to FIG. 10 together, the flow chart of this figure shows the second technique for correction value computation. The signal processor 107B reads out the decision error sum eb2 from the decision error register 126 at t1, the ending time of TDMA signals on the Mth channel (step 21). The signal processor 107B than reads the Mth channel correction value prM corresponding to the decision error eb2 from the correction data register 125-M, and computes a new correction value prM by Formula (4), using the read-out correction value prM, the decision error sum eb2 and the weighting coefficient v (or V1) which has been prepared in response to the receive information inf and varies over time (step 22). Finally, the signal processor 107B stores the new correction value prM into the correction data register 125-M (step 23). The flow described so far is repeated in the reception of TDMA signals on every channel.

Since the data demodulator illustrated in FIG. 7, which is another preferred embodiment of the present invention, wholly consists of digital circuits as stated above, it readily permits large scale integration and dispenses with adjustment. As any frequency drift is corrected instantaneously on every TDMA channel, demodulated data d2 with the least error rate can be obtained for every channel. Furthermore, the time constant for this frequency drift correction can be flexibly varied according to the reception state of receive signals r, so that frequency drift correction can be accomplished promptly at the time of starting the reception of burst signals r and with high resistance to noise during consecutive reception.

As hitherto described, data demodulators according to the invention readily permit large scale integration and dispense with adjustment because all their circuits including symbol synchronization circuits or frequency drift correcting circuits are digitized. Since these data demodulators flexibly vary the setting of the phase adjustment parameter for symbol synthronism and the correction parameter for frequency drift correction with the signal processor 107A and 107B and by a plurality of computing techniques including the varying of the weighting coefficients w and v over time according to the reception state of receive signals r, they have the characteristic of being able not only to promptly achieve said symbol synchronization and correct any frequency drift into a normal reception state on every TDMA channel but also to reproduce demodulated data in a normal reception state with a low error rate even in the presence of much noise.

Although the invention has been described with reference to specific embodiments, this description is not meant to be construed in a limiting sense. Various modifications of the disclosed embodiments, as well as other embodiments of the invention, will become apparent to persons skilled in the art upon reference to the description of the invention. It is therefore contemplated that the appended claims will cover any such modifications or embodiments as fall within the true scope of the invention.

What is claimed is:

1. A data demodulator provided with:
   phase detection means for detecting the phase of a receive signal having undergone differential phase-shift-keying (DPSK) by comparing the phase of said receive signal and that of a reference signal whose frequency is substantially equal to K (K is a positive integer) times the center frequency of said receive signal, and sampling the phase of said receive signal, which has been detected, to give a phase signal in a parallel signal form every time a clock signal is supplied, resulting from the division of the symbol period of said receive signal into N (N is a positive integer) phases, is supplied:
   delay means for generating a delayed phase signal by giving said phase signal a delay equal in length to said symbol period;
   phase difference detection means for generating a phase difference signal by subtracting said delayed phase signal from said phase signal; and
   decision means responsive to said phase difference signal for generating decision data, which is the result of the phase decision of said phase difference signal, further provided with:
   decision error computing means responsive to said phase difference signal and said decision data for computing a decision error on the basis of the difference between the phase of said phase difference signal and the decision phase of said decision data;
   N decision error adding means each for generating a decision error sum by adding said decision error every time said clock signal is supplied and for clearing said decision error sum in response to a clear signal;
   N decision error registers each for storing said decision error sum from the corresponding one of said decision error adding means every time a sampling signal is supplied;
   a sampling phase register for storing sampling phase signals;
   sampling means for generating symbol rate demodulated data by sampling said decision data in a phase indicated by said clock signal and said sampling phase signal; and
   signal processing means further comprising reading means for reading out said decision error sum from each of said N decision error registers, sampling phase computing means responsive to each of these decision error sums for computing said sampling phase signal by a prescribed computing technique, and storing means for storing said sampling phase signal into said sampling phase register.

2. A data demodulator, as claimed in claim 1, wherein said receive signal has undergone $\pi/4$-shift quadrature phase-shift-keying ($\pi/4$ QPSK).

3. A data demodulator, as claimed in claim 1, wherein said decision error computing means is decision error squaring means for generating said decision error by squaring the difference between the phase of said phase difference signal and the decision phase of said decision data.

4. A data demodulator, as claimed in claim 1, wherein said decision error computing means is absolute value computing means for generating said decision error by computing the absolute value of the difference between the phase of said phase difference signal and the decision phase of said decision data.

5. A data demodulator, as claimed in claim 1, further provided with timing signal generating means for generating said clock signal, said sampling signal and said clear signal.

6. A data demodulator, as claimed in claim 1, wherein said signal processing means is provided with:
   input/output (I/O) means for reading said decision error sum from each of said N decision error registers in a prescribed period and writing said sampling phase signal into said sampling phase register, and
   computing means responsive to said N decision error sums, which have been read out, for sending one of the phases of said clock signal to said I/O means as said sampling phase signal.

7. A data demodulator, as claimed in claim 6, wherein said computing means sends said clock signal phase corresponding to the smallest value of said decision error sum as said sampling phase signal.

8. A data demodulator, as claimed in claim 7, wherein said I/O means further receives receive information indicating the reception state of said receive signal, and
said computing means further is responsive to said receive information for correcting said decision error sums with a weighting coefficient corresponding to said receive information, and sending said clock signal phase indicating the smallest value of these corrected decision error sums as said sampling phase signal.

9. A data demodulator, as claimed in claim 8, wherein said corrected decision error sum is the weighted average of said decision error sum for the preceding adding period and of a newly added sum of said decision errors.

10. A data demodulator, as claimed in claim 7, wherein said sampling means comprises:
a first selector controlled by a channel number indicating signal to select one of said sampling phase signals;
a second selector controlled by said sampling phase signal from said first selector to select one of said N-phase clock signals, and
a sampling circuit for generating said symbol rate demodulated data by sampling said decision data with the clock signal selected by said second selector.

11. A data demodulator provided with:
phase detection means, receiving a receive signal having undergone π/4-shift quadrature phase-shift-keying (π/4 QPSK), for detecting the phase of said receive signal by comparing the phase of said receive signal and that of a reference signal whose frequency is substantially equal to K (K is a positive integer) times the center frequency of said receive signal, and sampling the phase of said receive signal, which has been detected, to give a phase signal in a parallel signal form every time a clock signal, resulting from the division of the symbol period of said receive signal into N (N is a positive integer) phases, is supplied;
delay means for generating a delayed phase signal by giving said phase signal a delay equal in length to said symbol period;
phase difference detection means for generating a phase difference signal by subtracting said delayed phase signal from said phase signal; and
decision means responsive to said phase difference signal for generating decision data, which is the result of the phase decision of said phase difference signal, further provided with:
timing signal generating means for generating a sampling signal, a clear signal and said clock signal;
decision error squaring means for generating the square of a definition error by squaring the difference between the phase of said phase difference signal and the decision phase of said decision data;
N decision error adding means each for generating the sum of the squares of decision errors by adding the square of said decision error every time said clock signal of the corresponding phase is supplied and for clearing the sum of the squares of said decision errors in response to said clear signal;
N decision error registers each for storing said decision error sum from the corresponding one of said decision error adding means every time a sampling signal is supplied;
a sampling phase register for storing sampling phase signals;
sampling means for generating symbol rate demodulated data by sampling said decision data in a phase indicated by said clock signal and said sampling phase signal; and
signal processing means further comprising I/O means for reading the sum of the squares of said decision errors from each of said N decision error registers in a prescribed period and writing said sampling phase signal into said sampling phase register, and computing means for sending one of the phases of said clock signal, corresponding to the smallest value of the squares of said decision errors among the N sums of the squares of said decision errors, which have been read out, to said input/output (I/O) means as said sampling phase signal.

12. A data demodulator provided with:
phase detection means, receiving a receive signal having undergone π/4-shift quadrature phase-shift-keying (π/4 QPSK), for detecting the phase of said receive signal by comparing the phase of said receive signal and that of a reference signal whose frequency is substantially equal to K (K is a positive integer) times the center frequency of said receive signal, and sampling the phase of said receive signal, which has been detected, to give a phase signal in a parallel signal form every time a clock signal, resulting from the division of the symbol period of said receive signal into N (N is a positive integer) phases, is supplied;
delay means for generating a delayed phase signal by giving said phase signal a delay equal in length to said symbol period;
phase difference detection means for generating a phase difference signal by subtracting said delayed phase signal from said phase signal; and
decision means responsive to said phase difference signal for generating decision data, which is the result of the phase decision of said phase difference signal, further provided with:
timing signal generating means for generating a sampling signal, a clear signal and said clock signal;
decision error squaring means for generating the square of a decision error by squaring the difference between the phase of said phase difference signal and the decision phase of said decision data;
N decision error adding means each for generating the sum of the squares of said decision errors by adding the square of said decision error every time said clock signal of the corresponding phase is supplied and for clearing the sum of the squares of said decision errors in response to said clear signal;
N decision error registers each for storing said decision error sum from the corresponding one of said decision error adding means every time a sampling signal is supplied;
a sampling phase register for storing sampling phase signals;
sampling means for generating symbol rate demodulated data by sampling said decision data in a phase indicated by said clock signal and said sampling phase signal; and
signal processing means further comprising input means for reading the sum of the squares of said decision errors from each of said N decision error registers in a prescribed period and receiving receive information indicating the reception state of said receive signal; output means for writing said sampling phase signal into said sampling phase register; weighted average decision error computing means for computing weighted average decision errors resulting from the weighted averaging of the N sums of the squares of said decision errors, which have been read out, and of the N sums of the squares of said decision errors in the preceding adding period; and computing means for sending one of the phases of said clock signal, corresponding to the smallest value of the sums of these weighted average decision errors to said output means as said sampling phase signal.

13. A data demodulator provided with:

phase detection means, for detecting the phase of a receive signal having undergone differential phase-shift-keying (DPSK) by comparing the phase of said receive signal and that of a reference signal whose frequency is substantially equal to K (K is a positive integer) times the center frequency of said receive signal, and sampling the phase of said receive signal, which has been detected, to give a phase signal in a parallel signal form every time a clock signal, resulting from the division of the symbol period of said receive signal into N (N is a positive integer) phases, is supplied;

delay means for generating a delayed phase signal by delaying said phase signal by one symbol;

phase difference detection means for generating a phase difference signal by subtracting said delayed phase signal from said phase signal; and decision means responsive to said phase difference signal for generating decision data, which is the result of the phase decision of said phase difference signal, wherein:

said receive signals are M-channel (M is a positive integer) time division multi-access (TDMA) signals, further provided with:

decision error computing means responsive to said phase difference signal and said decision data for computing a decision error on the basis of the difference between the phase of said phase difference signal and the decision phase of said decision data;

N decision error adding means each for generating a decision error sum by adding said decision error every time said clock signal is supplied and for clearing said decision error sum in response to a clear signal;

N decision error registers each for storing said decision error sum from the corresponding one of said decision error adding means every time a sampling signal is supplied;

M sampling phase registers for storing a sampling phase signal for each of said channels;

sampling means for generating symbol rate demodulated data by sampling said definition data in a phase indicated by said clock signal, said M sampling phase signals, and a channel number indicating signal; and signal processing means further comprising reading means for reading out said decision error sum for each of said channels from each of said N decision error registers, sampling phase computing means responsive to each of these decision error sums for computing said sampling phase signal for each channel by a prescribed computing technique, and storing means for storing each of said sampling phase signals into one or another of said M sampling phase registers.

14. A data demodulator, as claimed in claim 13, wherein said receive signal has undergone $\pi/4$-shift quadrature phase-shift-keying ($\pi/4$ QPSK).

15. A data demodulator, as claimed in claim 13, wherein said decision error computing means is decision error squaring means for generating said decision error by squaring the difference between the phase of said phase difference signal and the definition phase of said decision data.

16. A data demodulator, as claimed in claim 13, wherein said decision error computing means is absolute value computing means for generating said decision error by computing the absolute value of the difference between the phase of said phase difference signal and the decision phase of said decision data.

17. A data demodulator, as claimed in claim 13, further provided with timing signal generating means, receiving a frame signal notifying the TDMA channel switching of said receive signal, for generating said clock signal synchronized with this frame signal, said sampling signal, said clear signal, and said channel number indicating signal.

18. A data demodulator, as claimed in claim 17, wherein:

said sampling signal is prepared immediately before the end of reception of said receive signal on each TDMA channel;

said clear signal is prepared between the preparation of said sampling signal and the reception of said frame signal; and said channel number indicating signal is prepared upon reception of said frame signal.

19. A data demodulator, as claimed in claim 18, wherein said signal processing means further comprises:

input/output (I/O) means for reading said decision error sum from each of said N decision error registers every time said sampling signal is supplied, and writing said sampling phase signal into said sampling phase register for the corresponding channel, and computing means responsive to said N decision error sums, which have been read out, for sending one of the phases of said clock signal to said I/O means as said sampling phase signal.

20. A data demodulator, as claimed in claim 18, wherein said sampling phase computing means sends said clock signal phase corresponding to the smallest value of said decision error sum as said sampling phase signal.

21. A data demodulator, as claimed in claim 18, wherein said I/O means further receives receive information indicating the reception state of said receive signal, and said computing means further is responsive to said receive information for correcting said decision error sums with a weighting coefficient corresponding to said receive information, and sending said clock signal phase indicating the smallest value of these corrected decision error sums as said sampling phase signal.

22. A data demodulator, as claimed in claim 18, wherein said corrected decision error sum is the weighted average of said decision error sum for the preceding adding period and of a newly added sum of said decision errors.

23. A data demodulator provided with:

phase detection means, receiving a receive signal having undergone π/4-shift quadrature phase-shift-keying (π/4 QPSK), for detecting the phase of said receive signal by comparing the phase of said receive signal and that of a reference signal whose frequency is substantially equal to K (K is a positive integer) times the center frequency of said receive signal, and sampling the phase of said receive signal, which has been detected, to give a phase signal in a parallel signal form every time a clock signal, resulting from the division of the symbol period of said receive signal into N (N is a positive integer) phases, is supplied;

delay means for generating a delayed phase signal by giving said phase signal a delay equal in length to said symbol period;

phase difference detection means for generating a phase difference signal by subtracting said delayed phase signal from said phase signal; and decision means responsive to said phase difference signal for generating decision data, which is the result of the phase decision of said phase difference signal, wherein:

said receive signals are M-channel (M is a positive integer) time division multi-access (TDMA) signals, further provided with:

timing signal generating means, receiving a frame signal notifying the TDMA frame switching of said receive signal, for generating said clock signal synchronized with this frame signal, a sampling signal prepared immediately before the end of reception of said TDMA frame, a clear signal prepared between the preparation of said sampling signal and the reception of said frame signal, and a channel number indicating signal prepared upon reception of said frame signal;

decision error squaring means for generating the square of a decision error by squaring the difference between the phase of said phase difference signal and the decision phase of said decision data;

N decision error adding means each for generating the sum of the squares of said decision errors by adding the square of said decision error every time said clodk signal of the corresponding phase is supplied and for clearing the sum of the squares of said decision errors in response to said clear signal;

N decision error registers each for storing said decision error sum from the corresponding one of said decision error adding means every time a sampling signal is supplied;

M sampling phase registers for storing sampling phase signals for each of said channels;

sampling means for generating symbol rate demodulated data by sampling said decision data in a phase indicated by said clock signal, said M sampling phase signals, and said channel number indicating signal; and signal processing means further comprising I/O means for reading the sum of the squares of said decision errors from each of said N decision error registers at the generation timing of said sampling signal and writing each of said sampling phase signals into said sampling phase register of the corresponding channel, and computing means for sending one of the phases of said clock signal, corresponding to the samllest value of the squares of said decision errors among the N sums of the squares of said decision errors, which have been read out, to said I/O means as said sampling phase signal.

24. A data demodulator provided with:

phase detection means, receiving a receive signal having undergone π/4-shift quadrature phase-shift-keying (π/4 QPSK), for detecting the phase of said receive signal by comparing the phase of said receive signal and that of a reference signal whose frequency is substantially equal to K (K is a positive integer) times the center frequency of said receive signal, and sampling the phase of said receive signal, which has been detected, to give a phase signal in a parallel signal form every time a clock signal, resulting from the division of the symbol period of said receive signal into N (N is a positive integer) phases, is supplied;

delay means for generating a delayed phase signal by giving said phase signal a delay equal to said symbol period;

phase difference detection means for generating a phase difference signal by subtracting said delayed phase signal from said phase signal; and decision means responsive to said phase difference signal for generating decision data, which is the result of the phase decision of said phase difference signal, wherein:

said receive signals are M-channel (M is a positive integer) time division multi-access (TDMA) signals, further provided with:

timing signal generating means, receiving a frame signal notifying the TDMA frame switching of said receive signal, for generating said clock signal synchronized with this frame signal, a sampling signal prepared immediately before the end of reception of said TDMA frame, a clear signal prepared between the preparation of said sampling signal and the reception of said frame signal, and a channel number indicating signal prepared upon reception of said frame signal;

decision error squaring means for generating the square of a decision error by squaring the difference between the phase of said phase difference signal and the decision phase of said decision data;

N decision error adding means each for generating the sum of the squares of said decision errors by adding the square of said decision error every time said clock signal of the corresponding phase is supplied and for clearing the sum of the squares of said decision errors in response to said clear signal;

N decision error registers each for storing said decision error sum from the corresponding one of said decision error adding means every time a sampling signal is supplied;

M sampling phase registers for storing sampling phase signals for each of said channels;

sampling means for generating symbol rate demodulated data by sampling said decision data in a phase indicated by said clock signal, said M sampling phase signals, and said channel number indicating signal; and signal processing means further comprising input means for reading the sum of the squares of said decision errors from each of said N decision error registers at the generation timing of said sampling signal and receiving receive information indicating the reception state of said receive signal; output means for writing each of said sampling phase signals into said sampling phase register for the corresponding channel; weighted average decision error computing means for computing weighted average decision errors resulting from the weighted averaging of the N sums of the squares of said decision errors, which have been read out, and of the N sums of the squares of said decision errors in the preceding adding period with a weighting coefficient corresponding to said receive information; and computing means for sending one of the phases of said clock signal, corresponding to the smallest value of the sums of these weighted average decision errors to said output means as said sampling phase signal.

25. A data demodulator provided with:

phase detection means, for detecting the phase of a receive signal of an M-channel (M is a positive integer) time division multi-access (TDMA) formula having undergone differential phase-shift-keying (DPSK) by comparing the phase of said receive signal and that of a reference signal whose frequency is substantially equal to K (K is a positive integer) times the center frequency of said receive signal, and sampling the phase of said receive signal, which has been detected, to give a phase signal in a parallel signal form every time a clock signal, resulting from the division of the symbol period of said receive signal into N (N is a positive integer) phases, is supplied;

delay means for generating a delayed phase signal by giving said phase signal a delay equal in length to said symbol period;

phase difference detection means for generating a phase difference signal by subtracting said delayed phase signal from said phase signal; and decision means responsive to said phase difference signal for generating decision data, which is the result of the phase decision of said phase difference signal, further provided with:

subtracting means, inserted between said phase difference detection means and said decision means, for subtracting from a phase difference signal generated by said phase difference detecting means a correction value for correcting the D.C. offset of this phase difference signal, and supplying the corrected phase difference signal to said decision means;

decision error detection means responsive to the phase difference signal from said subtracting means and to said decision data for detecting the difference between the phase of said phase difference signal and the decision phase of said decision data;

decision error adding means for generating the sum of said decision errors by adding said decision errors in the period of the supply of channel number indicating signals every time said clock signal is supplied and for clearing the sum of said decision errors in response to a clear signal;

a decision error register for sampling the sum of said decision errors at the timing of a sampling signal which is supplied, and storing said decision error sum;

M correction registers for storing said correction value for each corresponding TDMA channel of said receive signals;

a selector for selecting said correction value from one of said M correction registers as indicated by a channel number indicating signal; and signal processing means further comprising reading means for reading said decision error sum out of said decision error register, computing means responsive to the read-out decision error sum for computing said correction value for each of said TDMA channels, and correction value storing means for storing these correction values into said correction registers for the respectively corresponding channels.

26. A data demodulator, as claimed in claim 25, wherein said receive signal has undergone $\pi/4$-shift quadrature phase-shift-keying ($\pi/4$ QPSK).

27. A data demodulator, as claimed in claim 25, further provided with:

timing signal generating means, receiving a frame signal notifying the TDMA channel switching of said receive signal, for generating said clock signal synchronized with this frame signal, said sampling signal, said clear signal, and said channel number indicating signal.

28. A data demodulator, as claimed in claim 27, wherein:

said sampling signal is prepared immediately before the end of reception of said receive signal on each TDMA channel;

said clear signal is prepared between the preparation of said sampling signal and the reception of said frame signal; and said channel number indicating signal is prepared upon reception of said frame signal.

29. A data demodulator, as claimed in claim 28, wherein:

said signal processing means further includes I/O means for reading the sum of said decision errors out of said decision error register at the timing of said sampling signal and writing each of said correction values into said correction registers for the respectively corresponding channels; and correction value computing means responsive to the sum of said decision errors, which has been read out, for computing said correction value for each of said TDMA channels and supplying these correction values to said I/O means.

30. A data demodulator, as claimed in claim 27, wherein:

said computing means computes the average of the sums of said decision errors in each prescribed period and for each of said TDMA channels, and adding said average to said correction value stored in said correction register for the corresponding channel to give a new correction value.

31. A data demodulator, as claimed in claim 30, wherein said prescribed period is one frame period of said TDMA signals.

32. A data demodulator, as claimed in claim 30, wherein said I/O means further receives receive information indicating the reception state of said receive signal, and said computing means further is responsive to said receive information for correcting said average with a weighting coefficient corresponding to said receive information, and adding this corrected average to said correction value to give a new correction value.

33. A data demodulator, as claimed in claim 32, wherein said computing means:
  computes said average uncorrected if it receives said receive information indicating the first burst reception of said receive signals, or
  computes said average corrected with said weighting coefficient if it receives said receive information indicating the reception of the same TDMA channel.

34. A data demodulator provided with:
  phase detection means, receiving a receive signal of an M-channel (M is a positive integer) time division multi-access (TDMA) formula having undergone $\pi/4$-shift quadrature phase-shift-keying ($\pi/4$ QPSK) for detecting the phase of said receive signal by comparing the phase of said receive signal and that of a reference signal whose frequency is substantially equal to K (K is a positive integer) times the center frequency of said receive signal, and sampling the phase of said receive signal, which has been detected, to give a phase signal in a parallel signal form every time a clock signal, resulting from the division of the symbol period of said receive signal into N (N is a positive integer) phases, is supplied;
  delay means for generating a delayed phase signal by giving said phase signal a delay equal in length to said symbol period;
  phase difference detection means for generating a phase difference signal by subtracting said delayed phase signal from said phase signal; and
  decision means responsive to said phase difference signal for generating decision data, which is the result of the phase decision of said phase difference signal,
  further provided with:
  timing signal generating means, receiving a frame signal notifying the TDMA channel switching of said receive signal, for generating said clock signal synchronized with this frame signal, a sampling signal prepared immediately before the end of reception on said TDMA channel, a clear signal prepared between the preparation of said sampling signal and the reception of said frame signal, and a channel number indicating signal prepared upon reception of said frame signal;
  subtracting means, inserted between said phase difference detection means and said decision means, for subtracting from a phase difference signal generated by said phase difference detecting means a correction value for correcting the D.C. offset of this phase difference signal, and supplying the corrected phase difference signal to said decision means;
  decision error detection means responsive to the phase difference signal from said subtracting means and to said decision data for detecting the difference between the phase of said phase difference signal and the decision phase of said decision data;
  decision error adding means for generating the sum of said decision errors by adding said decision error in the period of the supply of said channel number indicating signals every time said clock signal is supplied and for clearing the sum of said decision errors in response to said clear signal;
  a decision error register for sampling the sum of said decision errors every time said sampling signal is supplied and storing said decision error sum;
  M correction registers for storing said correction value for each corresponding TDMA channel of said receive signals;
  a selector for selecting said correction value from one of said M correction registers as indicated by said channel number indicating signal; and
  signal processing means further comprising reading means for reading said decision error sum out of said decision error register, computing means responsive to the read-out decision error sum for computing the average of the sums of said decision errors in each frame period of said TDMA signals and adding said average to said corrected value stored in said correction register of the corresponding TDMA channel to give a new correction value, and correction value storing means for storing these correction values into said correction registers for the respectively corresponding channels.

35. A data demodulator provided with:
  phase detection means, receiving a receive signal for detecting the phase of a receive signal of an M-channel (M is a positive integer) time division multi-access (TDMA) formula having undergone $\pi/4$-shift quadrature phase-shift-keying ($\pi/4$ QPSK) by comparing the phase of said receive signal and that of a reference signal whose frequency is substantially equal to K (K is a positive integer) times the center frequency of said receive signal, and sampling the phase of said receive signal, which has been detected, to give a phase signal in a parallel signal form every time a clock signal, resulting from the division of the symbol period of said receive signal into N (N is a positive integer) phases, is supplied;
  delay means for generating a delayed phase signal by giving said phase signal a delay equal to length to said symbol period;
  phase difference detection means for generating a phase difference signal by subtracting said delayed phase signal from said phase signal; and
  decision means responsive to said phase difference signal for generating decision data, which is the result of the phase decision of said phase difference signal:
  further provided with:
  timing signal generating means, receiving a frame signal notifying the TDMA channel switching of said receive signal, for generating said clock signal synchronized with this frame signal, a sampling signal prepared immediately before the end of reception of said TDMA frame, a clear signal prepared between the preparation of said sampling signal and the reception of said frame signal, and a channel number indicating signal prepared upon reception of said frame signal;
  subtracting means, inserted between said phase difference detection means and said decision means, for subtracting from a phase difference signal generated by said phase difference detecting means a correction value for correcting the D.C. offset of this phase difference signal, and supplying the corrected phase difference signal to said decision means;
  decision error detection means responsive to the phase difference signal from said subtracting means and to said decision data for detecting the difference between the phase of said phase difference signal and the decision phase of said decision data;

decision error adding means for generating the sum of said decision errors by adding said decision error in the period of the supply of said channel number indicating signals every time said clock signal is supplied and for clearing the sum of said decision errors in response to said clear signal;

a decision error register for sampling the sum of said decision errors every time said sampling signal is supplied and storing said decision error sum;

M correction registers for storing said correction value for each corresponding TDMA channel of said receive signals;

a selector for selecting said correction value from one of said M correction registers as indicated by said channel number indicating signal; and signal processing means further comprising reading means for reading said decision error sum out of said decision error register and receiving receive information indicating the reception state of said redeive signals, computing means for correcting the average of the sums of said decision errors read out in each frame period of said TDMA signals with a weighting coefficient corresponding to said receive information and adding this average to said correction value stored in said correction register of the corresponding TDMA channel to give a new correction value, and correction value storing means for storing these correction values into said correction registers for the respectively corresponding channels.

36. A data demodulator, as claimed in claim 35, wherein said computing means:

computes said average uncorrected if it receives said receive information indicating the first burst reception of said receive signals, or computes said average corrected with said weighting coefficient if it receives said receive information indicating the reception of the same TDMA channel.

* * * * *

UNITED STATES PATENT AND TRADEMARK OFFICE
CERTIFICATE OF CORRECTION

PATENT NO. : 5,412,694
DATED : May 2, 1995
INVENTOR(S) : Toshifumi Sato; Takayuki Shibata; Hideo Ohmura It is certified that error(s) appears in the above-identified patent and that said Letters Patent is hereby corrected as shown below:

Column 1, line 44, delete "of$\pi$", and insert --of $\pi$--;

Column 10, line 56, delete "redeive", and insert --receive--;

Column 11, line 32, delete "synthronism", and insert --synchronism--;

Column 17, line 48, delete "clodk", and insert --clock--;

Column 18, line 2, delete "samllest", and insert --smallest--;

Column 24, line 1, delete "redeive" and insert --receive--.

Signed and Sealed this

Seventh Day of November, 1995

*Attest:*

BRUCE LEHMAN

*Attesting Officer*     *Commissioner of Patents and Trademarks*